United States Patent Office 3,429,665
Patented Feb. 25, 1969

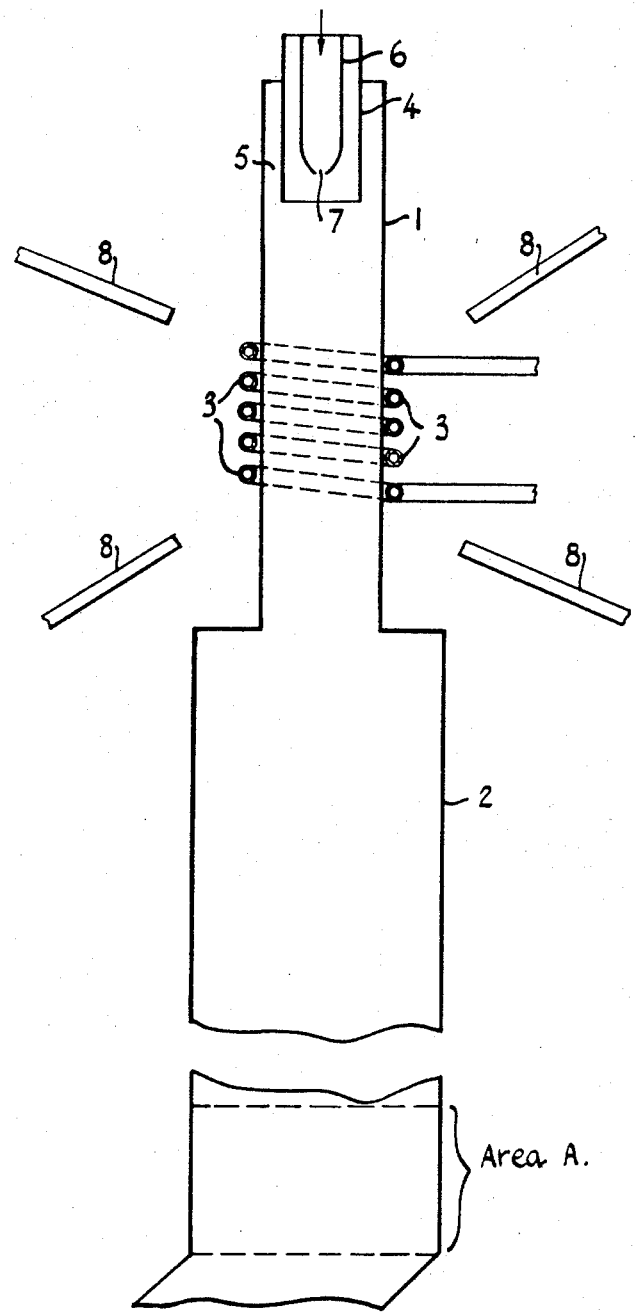

3,429,665
PRODUCTION OF PIGMENTARY SIZE TITANIUM DIOXIDE
Arthur Wallace Evans, Middlesbrough, and Denis Cleaver, Saltburn, England, assignors to British Titan Products Company Limited, Billingham, England, a corporation of the United Kingdom
Filed May 7, 1965, Ser. No. 454,022
Claims priority, application Great Britain, May 13, 1964, 20,000/64
U.S. Cl. 23—202    11 Claims
Int. Cl. C01g 23/04; C09c 1/36; B01d 7/00

ABSTRACT OF THE DISCLOSURE

Pigmentary titanium dioxide particles are produced by heating gas inert to titanium dioxide to a plasma state and admixing oxidic titaniferous material with the plasma state gas to vaporize the material and thereafter condensing from the mixture discrete particles of titanium dioxide of substantially reduced particle size as compared to the starting oxidic titaniferous material.

---

The present invention relates to a process for the production of finely-divided titanium dioxide, particularly pigmentary titanium dioxide.

The production of finely-divided titanium dioxide, particularly pigmentary titanium dioxide, by presently used processes is expensive and time consuming.

For example, the "sulphate" process entails digestion of a titaniferous starting material, such as ilmenite, with concentrated sulphuric acid; reduction of the iron content to ferrous state; clarification; thermal hydrolysis of the clarified titanyl sulphate solution to hydrous titanium dioxide pulp; prolonged washing of the pulp; addition of various pigment modifying agents; and calcination. After calcination the pigmentary properties of the material are developed by various milling, classification and coating processes.

In the "chloride" process, it is first necessary to produce titanium tetrachloride of high purity (normally by the chlorination of a titaniferous material, such as mineral rutile, followed by distillation in the presence of a purifying agent) and thereafter to oxidise the titanium tetrachloride in the vapour phase under carefully controlled conditions; preferably in the presence of pigment modifying agents. The pigmentary properties of the product, after recovery, are developed by similar processes to those used in the sulphate process.

If finely-divided titanium dioxide could be made by a process which reduced the number of steps at present required, a very substantial saving in time and, possibly, cost would be obtained.

It is an object of the present invention to provide such a process. The present invention provides a process for the production of finely-divided titanium dioxide comprising vaporising a titaniferous material and then condensing finely-divided titanium dioxide from the vaporised titaniferous material.

The present invention also provides a process for the production of finely-divided titanium dioxide comprising vaporising a titaniferous material containing at least 0.3% and generally at least 0.5%, of non-titanium containing impurity, and condensing finely-divided titanium dioxide which may contain less than 0.3% or less than 0.5% impurity (as the case may be) from the vaporised titaniferous material. The percentages of impurity are by weight of the titaniferous material. The impurity particularly envisaged is iron oxide, which may be present both as $Fe_2O_3$ and FeO. Other impurities may include aluminum, zirconium, manganese, silica and vanadium, normally present as oxides.

The condensed finely-divided titanium dioxide is preferably of pigmentary particle size, that is, it preferably has a mean weight particle size of 0.15 to 0.35 micron.

The vaporising of the titaniferous material is preferably effected by contacting the titaniferous material with a gas heated to a temperature above the boiling point of titanium dioxide. A theoretical temperature of at least 2000° C. is normally desirable. The energy level of the gas is normally at least 10 kilocalories per gramme mole of the gas in excess of the heat content required to raise the temperature of the gas to 1000° C. Normally, the heated gas should have an excess energy of at least about 600 kilocalories per gramme mole of titanium dioxide vaporised by the gas.

The gas may be heated to the necessary temperature by the application of electrical energy. For example, the gas may be heated by passing it through an electric discharge such as an arc formed between electrodes or preferably, it may be heated by means of a discharge formed in the absence of electrodes e.g. by induction heating. These methods of heating will be further described below.

The heated gas with which the titaniferous material is contacted is preferably in the form of a gas "plasma." Such a plasma normally contains "active species," for example dissociated molecules (where the gas is a diatomic gas), ions (i.e. atoms or molecules from which one or more electrons have been removed) and/or excited atoms or molecules (in which one or more electrons are in a higher energy orbit than under normal conditions).

The contacting of the titaniferous material and the hot gas is preferably effected by passing the former through the latter. In the case of a gas plasma, the titaniferous material may be passed through the plasma.

The particulate titaniferous material with which the gas plasma is contacted may be any material which forms gaseous titanium dioxide on vaporisation. It may, for example, be an iron-containing titaniferous material such as mineral rutile, leucoxene or possibly ilmenite. Alternatively, it may be substantially pure non-pigmentary titanium dioxide, for example that obtained from the bed accretions in the fluidised bed process for the oxidation of a titanium tetrahalide, particularly, when titanium dioxide particles are used as the initial bed material. A fluidised bed process for the production of titanium dioxide by the vapour phase oxidation of a titanium tetrahalide which may provide such material is described for example, in U.S. patent specification No. 2,828,187.

The titaniferous material is desirably finely-divided, and its particle size should preferably be such that it can conveniently and speedily be completely vapourised by contact with the gas plasma and is suitable for feeding to the plasma at the desired rate.

The heated gas forming the gas plasma must, of course, be one which is substantially inert to the titanium dioxide, e.g. argon, oxygen or a free-oxygen containing gas such as air. It is preferred to use oxygen or air. If desired, a mixture of two or more gases may be used and the inclusion of a proportion of another gas for example argon may be particularly useful when initiating the gas plasma. One such mixture may, for example, contain a minor proportion of a gas such as hydrogen which has a high heat conductivity to increase the rate of heat transfer between the heated gas and the particulate titaniferous material.

As mentioned above, the gas may be heated by being passed through an electrical discharge, such as an arc, formed between electrodes. The electrodes are preferably arranged in the form of a central electrode and an annular electrode both of which may be cooled by circulating a liquid coolant in heat exchange relationship with them.

The discharge between the electrodes may be stabilised by introducing the gas to be heated between the electrodes in the form of a helical or a sheath like (i.e. laminar) flow.

The current supplied to the electrodes may be either alternating current or direct current but is preferably the latter. The current should be sufficient to maintain the discharge at the flow rate of the gas between the electrodes and to maintain the gas plasma produced at the required energy level to vaporise the titaniferous material.

Where it is desired to impart a helical flow pattern to the gas passing between the electrodes, this may be accomplished by introducing the gas into the chamber containing the central electrode tangentially to the walls of this chamber through a restricted orifice. Sheath like (i.e. laminar) flow, on the other hand, may be formed by introducing the gas through an orifice or orifices evenly spaced around the periphery of the central electrode.

Such devices are described in our co-pending United States application No. 256,386.

It is preferred, however, to heat the gas to form a gas plasma in the absence of electrodes, for example by means of induction heating. In this case, the preferred method is to pass the gas through a space preferably surrounded by a confining tube having heat resisting walls, for example walls of silica. Around the space (e.g. around the external surface of the tube) is wound a coil of electrically conducting material, for example a coil of copper tubing. The ends of the electrically conducting material are connected to a source of oscillatory current of the appropriate frequency, preferably one in the range 200 kilocycles to 12 megacycles and particularly in the range 1 megacycle to 10 megacycles. The power input to the coil should be sufficient to maintain the plasma at the required energy level to vaporise the titaniferous material at the desired throughput rate.

Generally, in such induction heating a liquid coolant, for example water, is circulated through the coil carrying the oscillating current. If desired, this may be replaced by a gas, for example the gas which is to be heated to form the gas plasma, and in this manner the gas may be preheated before passing into the confining tube. It is preferred, however, to circulate a liquid coolant through the coil.

It is also advantageous to cool the outside of the confining tube and this may be accomplished either by blowing a gaseous coolant, for example air, on to the exterior of the tube or, if desired, by jacketing the wall and by circulating a liquid coolant through the jacket.

In order to stabilise the plasma in the confining tube the gas may be introduced into the confining tube to provide a helical flow through the plasma or, alternatively, the gas may be introduced in laminar flow down the interior walls of the confining tube thereby forming a "sheath" between the plasma and the confining tube wall. A mixture of both types of flow may be used, if desired. The laminar flow method of stabilisation is preferred since the stabilisation of the plasma by helical flow tends to throw solid material against the interior wall of the tube.

It has been found that when the titaniferous material to be vapourised is introduced into the gaseous plasma produced by the oscillatory current, the plasma tends to be displaced downstream from the space surrounded by the coil carrying the oscillatory current and may thereby be extinguished.

This tendency may be reduced or eliminated by forming the last turn of the coil (in the direction of the flow of titaniferous material) so that it conducts the oscillatory current in the opposite direction to that in the adjacent turn of the coil.

The number of turns in the coil may vary. For example, there may be 3 to 10, preferably 5 to 9, turns.

Where the coil comprises a suitable number of turns, for example, five or more, there may also be some advantage in forming the *first* turn (in the direction of flow of the titaniferous material) so as to conduct the oscillatory current in the opposite direction to that in the adjacent turn.

The direction of the current in a turn depends, of course, on the direction of the turn itself. Normally all the turns of the coil will be in one direction, except for the last turn which will be in the opposite (i.e. reverse) direction; as mentioned above, the first turn may also be in the same opposite direction, i.e. may be in the direction of the last turn.

If the last turn above is in the opposite direction, the coil should preferably have at least 4 turns in all. If the first and last turns are in the opposite direction, the coil should preferably have at least 5 turns in all.

The reversal of flow of the current in the last turn creates an opposing magnetic field, the effect of which is to exert a confining influence on the plasma to retain it within the volume encompassed by the coil and thus to resist displacement of the plasma beyond the last turn when solid titaniferous material is supplied to the plasma.

Similarly, when the first turn of the coil is also arranged to conduct the current in the opposite direction to that of the adjacent coil, the tendency of the plasma to form discharge streams upstream of the main body of the plasma which can lead to overheating of the apparatus (particularly the feed ports for solids and/or gases is diminished).

The reversed turn or turns of the coil is or are preferably a continuation of the remaining turns of the coil. The coil is preferably formed from a single length of electrically conducting material, for example copper tubing. Where a coolant is passed through the coil this will normally also pass through the reversed turn or turns before being withdrawn.

It is desirable that the titaniferous material is contacted with the heated gas, e.g. the gas plasma, in a manner which provides a sufficiently rapid transfer of heat to the titaniferous material to vapourise at least the greater part thereof during the time of contact. It is preferred (particularly where the gas plasma is produced in the absence of electrodes, for example by induction heating) to feed the titaniferous material to a conduit having a restricted outlet orifice which is close to the plasma and which is directed towards the centre of the latter. The walls of this conduit, particularly any parts thereof close to the plasma, may be cooled, for example by jacketing the walls and circulating a coolant through the jacket.

The maximum amount of titaniferous material which can be completely vapourised in a given apparatus without interrupting the process will depend upon a number of factors, for example, the particle size of the titaniferous material; the quantity of electrical energy supplied to the heated gas; the nature of the heated gas; the residence time of the material in the heated gas, e.g. the gas plasma; and the internal dimensions of the apparatus.

As noted above, it is desirable that the titaniferous material to be vapourised should be in a finely-divided form, for example having a mean particle size in the range from 30 to 1000 microns preferably 30 to 500 microns and particularly one in the range from 100 to 200 microns. It is also desirable that such material should be supplied at a controlled and preferably constant rate if optimum results are to be obtained.

One device which has been found very suitable for the supply of the finely-divided titaniferous material as a gaseous suspension, particularly as a "lean" gaseous suspension (i.e. one containing a small proportion of solid), is that described and claimed in our co-pending British application No. 6,380/65.

This device generally comprises a chamber into which finely-divided titaniferous material can be introduced and into which the carrier gas, for example oxygen, a free oxygen-containing mixture such as air or an inert gas such as argon, can be passed in such a manner and at a sufficient velocity to break down agglomerated particles and to entrain at least some of the particles as a gaseous suspension. A take-off duct is provided in the chamber (and leading to the plasma) through which the required proportion of the gaseous suspension can be removed from the chamber. Means are also provided for continuously filtering off the solid particles in the suspension which passes the opening of the take-off duct and the filtered gas thus produced may be reintroduced into the suspension passing along the take-off duct.

One particular form of device consists of a chamber to which the particulate titaniferous material can be continuously supplied and having a perforated base through which the carrier gas can be introduced to form a suspension. A pipe projects into the chamber through a partition at the top of the chamber to form the take-off duct which conducts a portion of the suspension to the place where the titaniferous material is vaporised and the top of the chamber surround the take-off duct is perforated in such a manner as to allow the passage therethrough of the carrier gas while retaining the particulate titaniferous material. After passing through the partition the filtered gas enters the take-off duct above the partition through an entry port or ports in the side of the duct.

By the selection of the appropriate dimensions and conditions of operation in such a device any desired quantity of finely-divided titaniferous material can be supplied at a constant rate in the form of a suspension in a suitable carrier gas over a prolonged period of time.

With regard to the nature of the heated gas, it is possible, as noted previously, to increase the rate of vaporisation by the use of a gas having a high thermal conductivity, e.g. hydrogen. Other gases which may be used include nitrogen, helium, neon, krypton, carbon dioxide and oxides of nitrogen.

The residence time of the particulate titaniferous material in the heated gas, e.g. the gas plasma, may be controlled to some extent by increasing or decreasing the length of the plasma, for example by varying the area covered by the coil through which the oscillating current is passed in induction heating.

A suitable combination of these factors may be found by trial for any given apparatus.

After vaporisation the titaniferous material is condensed by cooling to form finely-divided titanium dioxide, preferably pigmentary titanium dioxide. In order to enhance separation of the titanium dioxide from iron oxide present in the vaporised titaniferous material, a magnetic or electric field may be applied to the vaporised solid as it begins to condense.

The particle size of the titanium dioxide produced will depend upon the rate of cooling of the titanium dioxide vapour and this, in turn, will depend upon the loss of heat by convection, conduction and radiation, and upon heat removal by the introduction into the vapour of a quenching gas or liquid, if such gas or liquid is used. Where cooling is rapid the cooled vapour will be highly supersaturated and this will tend to cause the initial formation of a large number of small particles. Slower cooling on the other hand will tend to favour the production of a smaller number of larger particles.

Where the titaniferous material contains significant quantities of impurities (for example iron in the case of mineral rutile, leucoxene or ilmenite) it has been found that the titanium dioxide and the impurities tend to condense at different distances from the point of vaporisation and this can be controlled by the rate of cooling of the vapour. For example, where mineral rutile was vapourised by passing it through an oxygen plasma and the vaporised products were passed down a silica tube cooled by the ambient atmosphere it was found that the greater part of the iron condensed out on the wall of the lower part of the silica tube and titanium dioxide having a reduced iron content condensed as pigmentary material in the upper part of the tube. Some titanium dioxide was withdrawn from the apparatus as a white fume and recovered on a sock filter.

Thus by the process of the present invention, it is possible to obtain a substantial fractionation of the vaporised products and to obtain a reduction in the impurity content of pigmentary titanium dioxide prepared from impure starting materials.

Conditions of operation and the dimensions of the apparatus are preferably adjusted to ensure that the finely-divided titanium dioxide and any impurities present are at least partially separated by fractional condensation. The purified finely-divided titanium dioxide may then be recovered by known means, for example upon cloth filters or by electrostatic precipitation, or by cyclones, or the like.

In the absence of a rutilising agent during vaporisation and/or condensation of the titanium dioxide, the product may be predominantly in the anatase form. This may be avoided, if a rutile product is required, by introducing a rutilising agent such as an aluminium halide or zirconium tetrahalide with the particulate titaniferous material into the plasma. Alternatively, the rutilising agent may be introduced into the vapour after the latter has left the plasma and before condensation is complete. Slower cooling increases the proportion of rutile in the product.

In addition to rutilising agents, other materials may be contacted with the heated gas simultaneously with the titaniferous material and/or added to the titaniferous material after it has contacted the plasma. Examples of such other materials include modifying agents, such as compounds of silicon or boron e.g. the halides or lower halides of titanium particularly the chlorides, or water or alkali metal ions, particularly potassium ions. Such rutilising or modifying agents may, if desired, form part of a quenching fluid.

The titanium dioxide finally recovered may be subjected to known treatments, for example milling, classification and coating, before being bagged.

The drawing shows in section one apparatus which may be used in the process of the present invention.

The apparatus comprises two tubes 1 and 2, both tubes being of silica and the upper one 1 being of clear silica. Around the exterior of the upper tube in the position shown are wound coils of copper tubing 3 the ends of which are connected to a radio frequency generator (not shown). A space of about ¼" is left between the coils of copper tubing 3 and the exterior of the tube 1. Provision is made for passing water through the copper tubing 3.

In the upper end of the tube 1 is placed coaxially another silica tube 4 of smaller diameter than 1 thus providing an annular space 5 between the interior of tube 1 and the exterior of tube 4. Provision (not shown) is made for the introduction of a gas vertically through the annular space (5) to form a gas sheath for the plasma.

In tube 4 is placed co-axially another silica tube 6 of smaller diameter, the end of which is drawn out into an orifice 7 of smaller diameter than that of the tube 6 itself. Provision is made for the supply of particulate material to the interior of tube 6 together with a feed gas.

The lower end of silica tube 2 is connected through a filter (not shown) to a source of reduced pressure and provision is made for blowing air on to the exterior surface of tube 1 through pipes 8 in order to cool the tube.

The invention is illustrated by the following example.

Example I

An apparatus of the type shown and described in the drawing was used. The apparatus had the following dimensions:

Tube 1—Internal diameter, 2"; external diameter, 2 3/16"; length, 15"

Tube 2—Internal diameter, 3"; external diameter, 3½"; length, 3 ft.

Tube 4—Internal diameter, 1"; external diameter, 1¼"; length from top of tube 1, 4¾"

Copper tubing 3—Diameter, ¼" O.D., 20 S.W.G. thickness; No. of turns, 10; length of surface of tube 1 covered by coils of copper tube, 5"

Argon was introduced through the annular space 5 between tubes 1 and 4 at a rate of 40 litres/minute (R.T.P.) and cooling water was circulated through copper tubing 3.

An air blast several hundred litres/minute was commenced upon the outer surface of the tube 1 through pipes 8.

The supply to the coils of copper tubing 3 of an oscillating current at a frequency of 4 megacycles/second and a power input of 10 kilowatts was commenced and the formation of a plasma initiated by momentarily inserting a metal wire into that part of the tube 1 surrounded by the copper tubing 3.

When the plasma was established in argon this was gradually replaced by oxygen and the current supplied to the copper tubing was increased in frequency to 4.6 megacycles/second and the power input to 13 kilowatts.

When the plasma had been established, mineral rutile of 120 to 150 B.S.S. mesh, containing about 0.7% iron (as $Fe_2O_3$) was supplied to the open end of tube 6 at a rate of 0.1 g./min. together with a feed of 6 litres/minute of oxygen.

The apparatus was operated in this manner for 180 minutes after which the supply of mineral rutile was stopped, the oscillating current generator switched off and the oxygen supply discontinued.

Particles of anatase titanium dioxide having a mean weight particle size in the pigmentary range were recovered from area A of tube 2 as shown in the drawing containing 1.08% iron (as $Fe_2O_3$).

Pigmentary titanium dioxide particles in the form of anatase containing not more than about 0.3% iron (as $Fe_2O_3$) were recovered from the walls of tubes 1 and 2 below the plasma and extending down to the upper limit of area A.

Some solid and the gaseous products of the process were withdrawn from the lower end of tube 2 through a sock filter and titanium dioxide particles were recovered from the filter which contained 0.09% iron (as $Fe_2O_3$) and 16% of rutile titanium dioxide.

The particle size of the material was in the range 0.18 to 0.3μ.

Example 2

An apparatus was set up comprising an upper portion consisting of a first quartz tube 40 mm. outside diameter, 12" in length and having walls 2 mm. thick. The lower end of this was connected to a silica tube 4 ft. in length and 2" internal diameter which was externally lagged with asbestos string to ensure slower cooling of the vapourised material. Provision was made to withdraw the products from the lower end of the lagged silica tube through a filter sock system.

Around the first quartz tube were placed 5 turns of ¾" O.D. copper tube and provision was made for (a) connecting the ends of the tube to a source of oscillatory current and (b) for passing water through the tube. The lower coil of the copper tube was in the form of a reverse turn.

Within the first quartz tube was placed co-axially a second quartz tube of 28 mm. O.D. and 3" in length (i.e. terminating about 2" above the upper coil of copper tube) and a third quartz tube of similar length and 6 mm. O.D. (2 mm. I.D.) was placed co-axially within the second tube as a means for the introduction of finely divided mineral rutile into the plasma formed beneath the copper coil.

Two diametrically opposed quartz inlet pipes were inserted through the walls of the lagged silica tube about 1" below the joint between this tube and the first quartz tube (containing the plasma) and provision was made to introduce oxygen carrying the vapour of aluminium trichloride through these inlet pipes (as a rutilising agent).

Argon was introduced down the annular space between the first and second quartz tubes at a rate of about 30 litres/minute and water passed through the copper tube forming the coils.

An oscillatory current of a frequency of about 4 megacycles/second and a power input of 15 kilowatts was passed through the coil and the plasma initiated by means of a wire as described in Example I. The argon was then gradually replaced by oxygen and the frequency of the current increased to 6 megacycles/second and the power input to 20 kilowatts.

Mineral rutile having a particle size in the range 40 to 80μ and containing about 0.7% iron (as $Fe_2O_3$) was fed through the interior of the third quartz tube at a rate of about 0.05 gram/minute by means of a fluid bed feeder as described earlier in this specification.

Oxygen at a rate of two litres/minute and containing sufficient aluminium chloride vapour to give 2% alumina on the mineral rutile passed through the plasma was introduced through the inlet tubes below the plasma.

The product recovered from the filter sock was pigmentary titanium dioxide containing 98% of the rutile modification, 0.7% alumina and 0.7% iron (as $Fe_2O_3$). It had a particle size in the range of about 0.18 to 0.3μ and was very suitable for use as a pigment where whiteness was not of the first importance.

By varying the power input to the copper coil in the above process it appeared that, at least under the conditions of operation described above, an energy content of not less than about 40 kilocals/mole of plasma gas was desirable in order to vaporise mineral rutile having a particle size in the range 40 to 80μ and containing 0.7% iron (as $Fe_2O_3$).

What is claimed is:

1. A process for producing pigmentary titanium dioxide from particulate, oxidic, titaniferous material of greater than pigmentary size and from 30 to 1000 microns mean particle size which comprises the steps of:
    (a) heating to plasma state a gas characterized as substantially inert to titanium dioxide by increasing the energy level of said gas to a level at least 10 kilocalories per gram mol of gas in excess of that required to raise the temperature of the gas to 1000° C. and at least to the level corresponding to a theoretical temperature of 2000° C.;
    (b) intimately mixing with said plasma state gas said particulate, oxidic titaniferous material;
    (c) vaporizing said oxidic titaniferous material in said mixture with said plasma state gas; and
    (d) condensing from said mixture discrete particles of titanium dioxide of substantially reduced particle size as compared to said oxidic titaniferous material mixed with said plasma.

2. A process in accordance with claim 1 wherein said gas is heated by passage through an electric arc formed between electrodes.

3. A process in accordance with claim 1 wherein said gas is heated by induction heating induced by a coil, the gas being passed along the axis of the coil so as to form a plasma within the coil.

4. A process in accordance with claim 1 in which said titaniferous material contains at least 0.5% of non-titaniferous impurity and which said titanium dioxide product is obtained by selective condensation to contain substantially less than 0.5% of said non-titaniferous impurity.

5. A process for producing pigmentary titanium dioxide directly from particulate, oxidic titaniferous material having a mean particle size of from 30 to 1000 microns and which contains an impurity selected from the group consisting of the oxidic compounds of iron, aluminum, zirconium, magnesium, silicon, vanadium and mixtures thereof, comprising the steps of:

(a) heating to plasma state a gas characterized as substantially inert to titanium dioxide by increasing the energy level of said gas to a level at least 10 kilocalories per gram mol of gas in excess of that required to raise the temperature of the gas to 1000° C. and at least to the level corresponding to a theoretical temperature of 2000° C.;

(b) intimately mixing with said plasma state gas said particulate, oxidic titaniferous material;

(c) vaporizing said oxidic titaniferous material in said mixture with said plasma state gas; and (d) condensing from said mixture discrete particles of titanium dioxide of substantially reduced particle size as compared to said oxidic titaniferous material mixed with said plasma.

6. A process in accordance with claim 5 wherein said gas is heated by passage through an electric arc formed between electrodes.

7. A process in accordance with claim 5 wherein said gas is heated by induction heating induced by a coil, the gas being passed along the axis of the coil so as to form a plasma within the coil.

8. A process for producing pigmentary titanium dioxide which comprises vaporizing particulate, oxidic, titaniferous material having a mean particle size in the range of from 30 to 1000 microns containing at least 0.3% of an oxide selected from the group consisting of iron oxide, aluminum oxide, zirconium oxide, magnesium oxide, silicon oxide, vanadium oxide and mixtures thereof by contacting said material with a gas which is substantially inert to titanium dioxide and which has been heated to over 2000° C. to the plasma state by means of an electric discharge, and condensing from the vaporized material pigmentary titanium dioxide particles having a mean weight particle size of 0.15 to 0.35 micron and containing substantially less than 0.3% of said selected oxide.

9. The process of claim 8 in which the vaporisation of the titaniferous material is effected by contacting said material with a gas having an energy level which is at least 10 kilocalories per gramme mole of the gas in excess of the heat content which is required to raise the temperature of the gas to 1000° C.

10. The process of claim 8 in which the electrical discharge is an electric arc formed between electrodes.

11. The process of claim 8 in which the electrical discharge is formed by induction heating induced by a coil, the gas being passed along the axis of the coil so as to form a plasma within the coil.

References Cited

UNITED STATES PATENTS

| | | | |
|---|---|---|---|
| 2,921,892 | 1/1960 | Casey | 204—164 |
| 3,118,732 | 1/1964 | Richards et al. | 106—300 X |
| 3,211,528 | 10/1965 | Wigginton | 106—300 X |
| 3,214,284 | 10/1965 | Wilson | 106—300 |

NORMAN YUDKOFF, *Primary Examiner.*

F. E. DRUMMOND, *Assistant Examiner.*

U.S. Cl. X.R.

23—294; 106—300; 203—49, 100